(12) United States Patent
Gunther

(10) Patent No.: US 8,781,661 B2
(45) Date of Patent: Jul. 15, 2014

(54) ELECTRIC DRIVE SHAFT AND RETROFIT SYSTEM

(76) Inventor: Johan Gunther, Santa Monica, CA (US)

( * ) Notice: Subject to any disclaimer, the term of this patent is extended or adjusted under 35 U.S.C. 154(b) by 112 days.

(21) Appl. No.: 13/486,788

(22) Filed: Jun. 1, 2012

(65) Prior Publication Data

US 2013/0325207 A1 Dec. 5, 2013

(51) Int. Cl.
*B60K 1/00* (2006.01)
*G06F 19/00* (2011.01)

(52) U.S. Cl.
USPC ......... 701/22; 701/33.2; 180/65.26; 180/65.8

(58) Field of Classification Search
None
See application file for complete search history.

(56) References Cited

U.S. PATENT DOCUMENTS

| | | | |
|---|---|---|---|
| 6,388,348 B2 | 5/2002 | van Heyden et al. | |
| 7,698,078 B2 * | 4/2010 | Kelty et al. | 702/63 |
| 8,217,620 B2 * | 7/2012 | Hanssen et al. | 320/104 |
| 8,326,470 B2 * | 12/2012 | Mirle | 701/2 |
| 8,527,129 B2 * | 9/2013 | Atluri et al. | 701/22 |
| 2002/0179350 A1 * | 12/2002 | Li | 180/65.3 |
| 2006/0000650 A1 * | 1/2006 | Hughey | 180/65.2 |
| 2007/0161455 A1 * | 7/2007 | King et al. | 477/3 |
| 2007/0175681 A1 * | 8/2007 | King et al. | 180/65.4 |
| 2008/0133109 A1 * | 6/2008 | Carlson | 701/102 |
| 2009/0223725 A1 * | 9/2009 | Rodriguez et al. | 180/65.21 |
| 2010/0268401 A1 * | 10/2010 | Blakemore et al. | 701/2 |
| 2010/0308986 A1 * | 12/2010 | Dobryden et al. | 340/438 |

* cited by examiner

*Primary Examiner* — Michael J Zanelli
(74) *Attorney, Agent, or Firm* — R. Scott Kimsey, Esq.; Klein DeNatale Goldner

(57) ABSTRACT

A machine having a transmission, a differential, and a drive shaft disposed therebetween has an improvement including a stator with a substantially cylindrical opening extending therethrough, and a rotor that rotates relative to the stator. The rotor is attached to the drive shaft in axial alignment, and rotation of the drive shaft causes a corresponding rotation of the rotor. At least a portion of the drive shaft extends through the opening in the stator. A semi-rigid coupling extends between the stator and the transmission.

18 Claims, 2 Drawing Sheets

ELECTRIC DRIVE SHAFT AND RETROFIT SYSTEM

RELATED APPLICATIONS

Not Applicable.

BACKGROUND OF THE INVENTION

1. Field of the Invention

The present invention relates generally to a drive shaft and electric motor, and more specifically to an electric motor drive shaft retrofit system for replacing a drive shaft of a vehicle.

2. Background

The increasing cost of fossil fuels, along with the negative environmental impact of the use of such fuels, has led to great interest in the development of electric or hybrid vehicles. In such vehicles, at least a portion of the power required to move the vehicle comes from electrical energy, typically provided by batteries associated with the vehicle. A combustion engine may be provided for increased power when necessary, or to provide power when the vehicles batteries have been depleted.

One drawback to such vehicles is the need to charge the batteries using an electrical outlet or some other source of current. The charging process can be time-consuming or inconvenient, and in some instances a source of current may not be readily available. Further, the electricity provided via an electrical outlet or other source of current may ultimately stem from the burning of fossil fuels such as coal. Thus, it is desirable for an electric or hybrid vehicle to include some system for generation of its own current to charge batteries or power the electrical systems of the vehicle.

SUMMARY OF THE INVENTION

The present invention provides an improvement for a machine having a transmission, a differential, and a drive shaft disposed therebetween. The improvement includes a stator with a substantially cylindrical opening extending therethrough, and a rotor that rotates relative to the stator. The rotor is attached to the drive shaft in axial alignment, and rotation of the drive shaft causes a corresponding rotation of the rotor. At least a portion of the drive shaft extends through the opening in the stator. A semi-rigid coupling extends between the stator and the transmission.

In another aspect of the present invention, the transmission includes a tail piece, and the tail piece and drive shaft are connected by a U-joint. The semi-rigid coupling extends between the stator and the transmission in such a manner as to cover the U-joint.

Another aspect of the invention provides a vehicle including a differential, a drive shaft coupled to the differential at a first end of the drive shaft, and a second drive shaft coupled to the first drive shaft. The second drive shaft includes a stator with a substantially cylindrical opening extending therethrough, and a rotor disposed on the second drive shaft such that it rotates relative to the stator. At least a portion of the second drive shaft extends through the opening in the stator. The second drive shaft is also coupled to a transmission at an end of the second drive shaft opposite the end coupled to the first drive shaft.

In another aspect of the invention, the vehicle includes a semi-rigid coupling extending between the stator and the transmission.

In another aspect of the invention, the vehicle includes a housing attached to the underside of the vehicle, the housing having openings in either end for a portion of the second drive shaft to extend therethrough.

In another aspect of the invention, the first drive shaft is coupled to the second drive shaft via a U-joint, and the second drive shaft is coupled to the transmission via a U-joint.

In another aspect of the invention, the vehicle includes a battery in electrical communication with the electric motor of the present invention. The electric motor charges the battery.

In another aspect of the invention, a motor controller is provided for controlling the electric motor.

In another aspect of the invention, a hybrid controller is provided for selectively engaging and disengaging the electric motor and for controlling the relative power contribution of the electric motor and a combustion engine associated with the vehicle.

In another aspect of the invention, the hybrid controller is programmable by the operator of the vehicle.

In another aspect of the invention, the hybrid controller is programmable by the operator of the vehicle using a software application on a mobile computing device.

In another aspect of the invention, a method of programming a controller regulating the relative contribution of an electric motor and a combustion motor is provided. The method includes the steps of providing a mobile computing device capable of communicating with the controller of a hybrid vehicle, receiving from a user of the mobile computing device an input setting the relative contribution of the electric motor or the combustion motor, and programming the controller to reflect the input of the user.

In another aspect of the invention, the mobile computing device is a mobile phone having a software application programmed to receive an input from the user and program the controller accordingly.

DETAILED DESCRIPTION OF THE INVENTION

The present invention provides an electric hybrid system that can be retrofitted to an existing vehicle, and that is separate from or external to the existing combustion engine and transmission of the vehicle. The present invention is suitable for use in any vehicle having at least one drive shaft associated therewith. Apart from the inclusion of the present invention, the vehicle may in other respects be similar to a standard vehicle, such as an automobile, in use today. The vehicle preferably includes, for example, an operator area from which a driver of the vehicle is able to operate the vehicle. The operator area preferably includes a seat and a plurality of controls for steering, braking, signaling, starting, and accelerating the vehicle, and may include controls for any of a variety of other functions commonly found on vehicles. Likewise, the drive train of the vehicle may include a rear drive and/or front drive, according to the vehicle type. Vehicles for which the present device is suited preferably also include at least one differential associated with either the front or rear axle of the vehicle. Vehicles may also include both front and rear differentials, and in vehicles having both front and rear differentials, a center differential maybe provided due to the disparity in distance traveled by the front and rear wheels during a turn. Vehicles having four-wheel drive preferably include a transfer case or transfer gear case.

Figure 1:
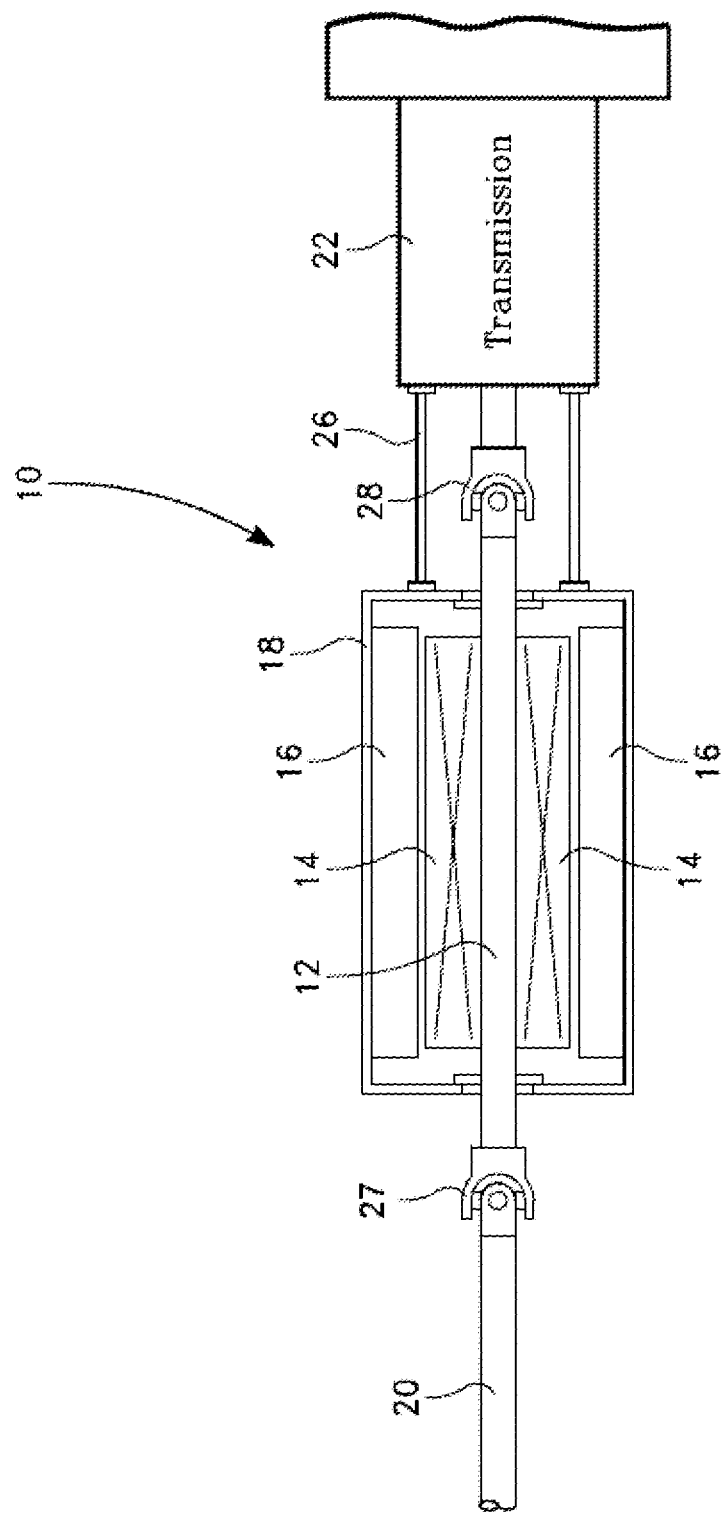
FIG. 1 is a schematic view of one embodiment of the present invention in a vehicle having a dual shaft arrangement.
Figure 2:
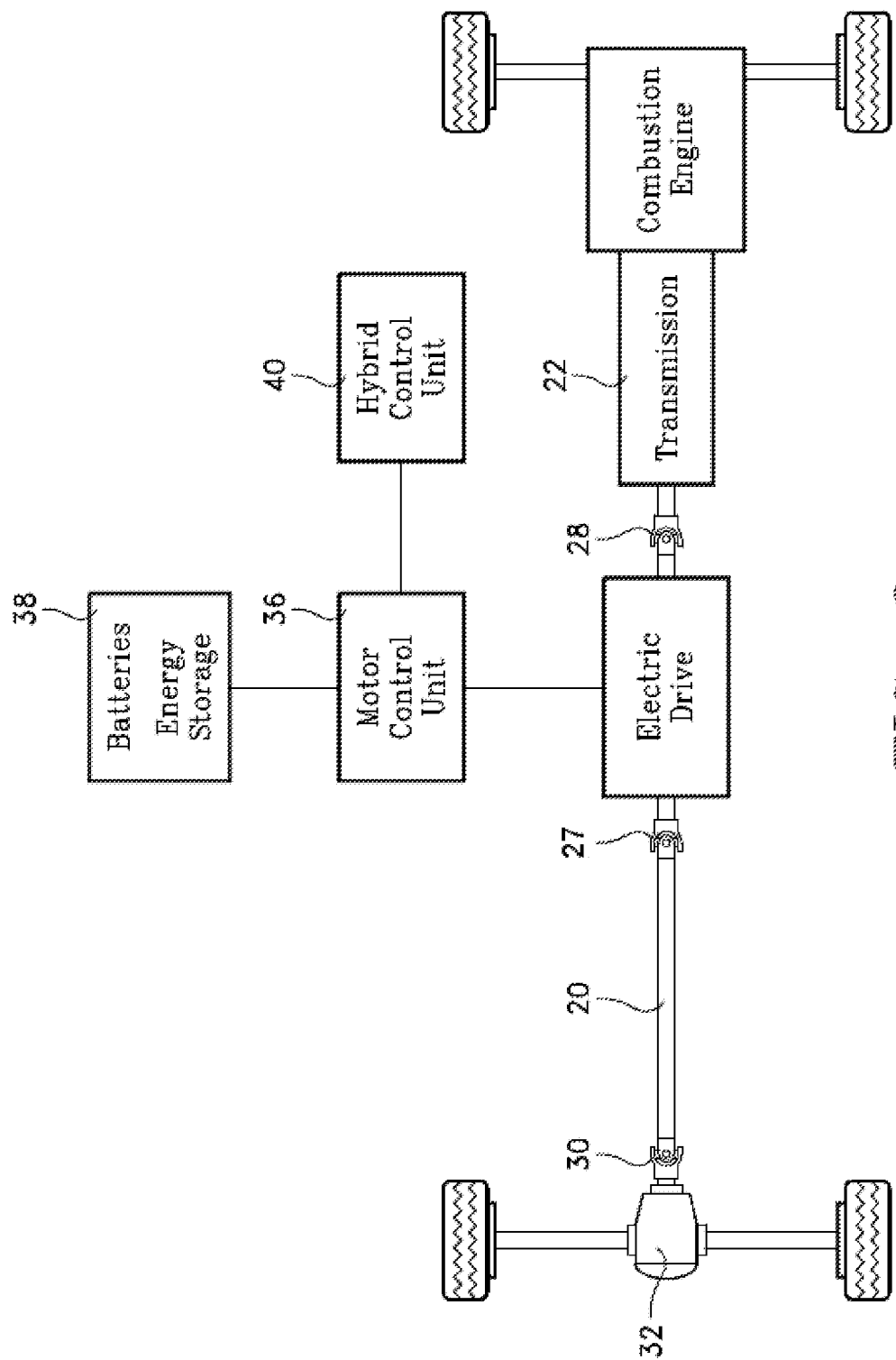
FIG. 2 is a schematic view of an embodiment of the present invention in a vehicle having a dual shaft arrangement, the view showing additional components of the invention and vehicle.

Turning to the drawings, wherein like numerals indicate like parts, the numeral 10 refers generally to an electric drive shaft system constructed according to the teachings of the present invention. As shown in FIG. 1, electric drive shaft system 10 preferably includes a drive shaft 12 having a coupling (such as, for example, U-joint connections 27 and 28) at either end. Drive shaft 12 further includes a rotor 14 fixedly attached thereto, such that when driveshaft 12 rotates there is a corresponding rotation of rotor 14.

An outer housing 18 is provided, covering at least a portion of drive shaft 12. Outer housing 18 includes openings on opposing ends thereof so that opposing ends of drive shaft 12 can extend through the openings. Drive shaft 12 is rotatable within outer housing 18, and outer housing 18 does not rotate along with drive shaft 12. Outer housing 18 includes a stator 16 fixedly attached thereto, the stator positioned to extend around rotor 14 so that when rotor 14 rotates a current is induced within stator 16. These components, together, form an electric motor.

Stator 16 preferably comprises a plurality of stampings to receive the windings necessary for the stator to function. Design and production of stators is known in the art, and it is contemplated that any suitable stator may be used with the present invention. Likewise, design and construction of rotors is known in the art and any suitable rotor may be used as rotor 14 of the present invention. A suitable rotor 14 may, for example, be of the squirrel cage variety, having a cylindrical laminated core with parallel slots for containing the rotor conductors. The conductors in a squirrel cage rotor are typically not wires, but instead a plurality of bars (such as copper, aluminum, or alloys thereof). Alternatively, a wound rotor may be utilized, wherein a series of insulated rotor coils are used instead of the bars described above. As noted, any suitable rotor may be used, and because the construction and design of rotors and stators is known in the art, the various components of these devices are not illustrated in the Figures.

As shown in the drawings and noted above, each end of shaft 12 preferably forms a U-joint with another component of the present system. The use of U-joints allows the present system to deal with misalignment or movement of the various components thereof.

In some embodiments of the present invention, it is preferred that a flexible or semi-rigid coupling 26 extend between stator 16 (or housing 18 having stator 16 contained therein) and transmission 22 of the vehicle in which the present system is provided. The coupling 26 preferably includes internally-cast torsion supports to deal with the torque from the electric motor, and preferably also includes straps or other fasteners to secure the electric motor in the event of a U-joint failure. Although in some embodiments, coupling 26 may extend from stator 16 or housing 18 to transmission 22, it is contemplated that in other embodiments of the invention, coupling 26 may be molded to fit around the tail piece of transmission 22, such as through the use of an internally-cast clamp, or may be attached to both components of the present invention via bolt flanges. Any suitable method of fastening or attaching coupling 26 may be used. Coupling 26 not only provides structural support but reduces or eliminates heat transfer between the electric motor and transmission 22 of the present invention. This also provides for a less expensive and easier installation of the present invention, in which no adapter is required to be installed on the vehicle transmission in place of the original tail piece. Further, the installation of the present invention is more fully adjustable because the present invention can be angled such that it reflects the angle of the original drive shaft and thus follows the chassis better than if it were rigidly mounted in place.

As noted above, one end of drive shaft 12 preferably includes a U-joint 28 for attaching to a tail piece of transmission 22. The other end of drive shaft 12 also preferably includes a U-joint 27. U-joint 27 may allow attachment to a differential 32, or to a second shaft 20, the second shaft 20 then being attached, via a U-joint 30, to differential 32. Although a U-joint is shown in the Figures, it is contemplated that any suitable flexible shaft coupling may be used. For example, a rubber disk with dual bolt-flanges may be used, as is known in some European automobiles.

It is contemplated that an existing vehicle can be retrofitted with the present invention. In the dual-shaft arrangement mentioned above, for example, one of the pre-existing drive shafts of the vehicle may be replaced with drive shaft 12 and the corresponding components of the present invention. In a vehicle having a single drive shaft extending from a transmission 22 to a front differential 32, drive shaft 12 and the corresponding components of the present invention may replace that existing drive shaft. Some embodiments of the present invention may be adapted for use with four-wheel drive vehicles, in which case U-joint 27 of drive shaft 12 may be attached to a transfer case (not shown).

As noted above, drive shaft 12 having rotor 14 disposed thereon, rotor 14 rotating within a stator 16, generates electrical energy. This electrical energy, or current, may be directed via wiring to various systems or components of the vehicle in which the present invention is utilized, the current helping to power these systems or components. It is contemplated that various suitable methods of wiring the components of the present invention will be readily ascertainable to those of skill in the art upon reading this disclosure, and as such the details of various approached to wiring are not provided here.

A motor control unit 36 may be provided to control flow of current produced by the electric motor of the present invention. The current may be directed to various systems or components of the present invention, or may be directed to batteries 38 where energy can be stored for later use. In addition, current produced by the electric motor may, if necessary, pass through an inverter or rectifier prior to being used by the present system. Motor control unit 36 is preferably fully-programmable such that it is suitable for use with any motor. It should also be noted that batteries 38 may be any type of battery suitable for use with an electric vehicle. Such batteries may include, but are not limited to, lead-acid batteries, nickel metal hydride batteries, and lithium-ion batteries. Of these, nickel metal hydride and lithium-ion batteries are preferred. In some embodiments of the present invention, a control may be provided in the operator area so that the operator can selectively engage or disengage the electric motor of the present invention.

A hybrid control unit 40 may be provided to regulate the interaction between the electric motor of the present invention and the combustion engine of the vehicle in which the present invention is utilized. Hybrid control unit 40 can control electricity generation by the electric motor of the present invention, adjusting the generation of power such that a greater amount is produced when needed, and a lesser amount produced (along with greater energy output by the combustion engine) when power from the combustion engine is needed. Further, the hybrid control unit may be programmed to selectively engage or disengage the electric motor of the present invention according to predetermined criteria. Hybrid control unit 40 further preferably has a torque or load-sensing functionality. The hybrid control unit 40 may be in communication with a torque sensor on the electric motor, as well as with a torque sensor on the combustion engine associated with the vehicle. An operator of the vehicle may set hybrid control unit 40 such that a desired percentage of torque is supplied by the electric motor as oppose to the combustion engine, or vice versa. Alternatively, hybrid control unit 40 may make such determinations automatically, as appropriate for a type of trip selected by a user (e.g. long, short, winding or elevated terrain, flat, and the like).

The control units described herein have access to at least one memory. The memory is preferably non-volatile, such that data contained within the memory is retained even when the memory is not receiving power. Exemplary types of such memory include EEPROM, PROM, NVRAM, and the like. In some embodiments of the present invention, the memory utilized by the motor control unit and/or the hybrid control unit may be programmable by an operator of the present device. In such embodiments, the operator may be provided with a graphical-user interface within the vehicle in order to program the memory. Alternatively, the vehicle or the memory may be adapted to interface with an external device, such as a general purpose computer, hand-held computing device, laptop, tablet, or other suitable device. The external device may include software that provides the operator of the vehicle with a graphical user interface that allows programming of the memory.

It is contemplated that the present invention may also be utilized in vehicles having other systems in place for providing power to batteries 38. For example, the present device may be utilized within a vehicle having a regenerative braking system. Examples of regenerative braking systems are known in the art. When a traditional braking system is employed, much of the mechanical energy associated with the moving vehicle dissipates as heat when the braking system is engaged. With a regenerative braking system, a portion of that mechanical energy is converted into electrical energy to power the electrical systems of the vehicle or to charge the vehicle's batteries. In embodiments of the present invention wherein the vehicle includes a regenerative braking system, a controller may be utilized to selectively engage and disengage the regenerative braking mechanism.

In some embodiments of the present invention, components of the present invention may be provided in the form of a kit. Such a kit may include the components needed to retrofit a vehicle with the device of the present invention. For example, such a kit may include a drive shaft 12 having couplings (such as U-joints 27 and 28), rotor 14 fixedly attached to drive shaft 12, stator 16 within housing 18, and flexible or semi-rigid coupling 26. Also preferably included are a battery, an instrument or indicator for determining the charge of the battery, and the wiring necessary to properly wire the components of the invention. In some embodiments of a kit, programmable controllers as described above may be provided. Written indicia included with the kit provide instruction to a user on removal of an existing drive shaft in a vehicle and the installation of the present invention in its place.

In another aspect of the invention, a software application, such as for an cellular phone, tablet, laptop, or other mobile computing device is provided. The mobile computing device is in communication with one or more controllers of the present invention, described above. The software provides a user thereof with the ability to program the controllers or modify the hybrid effect produced by the present invention (i.e. the percentage of torque generated by the electric motor as opposed to the combustion engine). In some embodiments of the invention, the computer software providing such functionality may be contained within a computing device fixed within the car itself, allowing the user to program the hybrid system of the present invention via an interface on the car's instrument panel or elsewhere within the vehicle.

The embodiments of the present invention described above are presented for purposes of illustration of the concepts of the present invention, and are not intended to be limiting. It is contemplated that one of skill in the art will readily ascertain various modifications to the present invention upon reading this disclosure, and such modifications are intended to be within the spirit and scope of the present invention.

Having thus described the preferred embodiment of the invention, what is claimed as new and desired to be protected by Letters Patent includes the following:

1. In a machine of the type having a transmission, a differential, and a drive shaft disposed therebetween, the improvement comprising:
   a stator defining a substantially cylindrical opening extending therethrough;
   a rotor disposed to be rotated relative to the stator, the rotor attached to the drive shaft along a length thereof such that rotation of the drive shaft causes a corresponding rotation of the rotor, at least a portion of the drive shaft extending through the opening defined by the stator; and
   a coupling attached to the stator and the transmission and extending therebetween.

2. The improvement according to claim 1, wherein the transmission comprises a tail piece, the drive shaft and the tail piece of the transmission connected by a U-joint, and further wherein the coupling extends between the stator and transmission in such a manner as to cover the U-joint.

3. The improvement according to claim 1, wherein the coupling is a semi-rigid coupling.

4. A vehicle comprising:
   a differential;
   a first drive shaft coupled with said differential at a first end of said first drive shaft;
   a second drive shaft coupled with said first drive shaft at a second end of said first drive shaft and a first end of said second drive shaft, the second drive shaft comprising:
      a stator defining a substantially cylindrical opening extending therethrough;
      a rotor disposed to be rotated relative to the stator, at least a portion of the rotor extending through the opening defined by the stator, the rotor attached to the drive shaft along a length thereof such that rotation of the drive shaft causes a corresponding rotation of the rotor; and
   a transmission coupled with said second end of said second drive shaft.

5. The vehicle according to claim 4 further comprising a semi-rigid coupling attached to the stator and the transmission and extending therebetween.

6. The vehicle according to claim 4 further comprising a housing, the stator fixedly attached within said housing, the housing defining openings at opposing ends thereof to allow extension of at least a portion of the second drive shaft therethrough.

7. The vehicle according to claim 6 further comprising a coupling attached to the transmission and the housing and extending therebetween.

8. The vehicle according to claim 4, further comprising:

a housing attached to an underside of said vehicle, the stator attached to an interior surface of the housing, the housing defining openings at opposing ends thereof to allow a portion of the second drive shaft to extend therethrough.

9. The vehicle according to claim 8 wherein the first drive shaft is coupled with the second drive shaft via a U-joint, and further wherein the second drive shaft is coupled to the transmission via a U-joint.

10. The vehicle according to claim 9 further comprising a semi-rigid coupling extending from said housing to said transmission, the U-joint connecting the second drive shaft and the transmission disposed within said semi-rigid coupling.

11. The vehicle according to claim 4 wherein the stator and rotor form an electric motor, the vehicle further comprising:

a battery in electrical communication with said electric motor, the battery adapted to be charged by said electric motor.

12. The vehicle according to claim 11 further comprising a controller for controlling said electric motor.

13. The vehicle according to claim 11 further comprising a hybrid controller for selectively engaging and disengaging said electric motor, and for regulating the relative power contribution of said electric motor and a combustion engine associated with said vehicle.

14. The vehicle according to claim 13 wherein the hybrid controller is programmable by an operator of said vehicle.

15. The vehicle according to claim 14, wherein the hybrid controller is programmable by the operator of said vehicle via a software application on a mobile computing device.

16. A hybrid vehicle system comprising:
a vehicle comprising:
   a drive shaft;
   an electric motor comprising:
      a stator defining a substantially cylindrical opening extending therethrough; and
      a rotor disposed relative to the stator, the rotor attached to the drive shaft along a length thereof such that rotation of the drive shaft causes a corresponding rotation of the rotor, the portion of the length of the drive shaft having the rotor attached thereto extending through the opening in the stator; and
   a combustion motor;
a controller adapted to receive wireless communications for regulating the relative contribution of the electric motor and the combustion motor to the total power used to drive the hybrid vehicle; and
a mobile computing device in wireless communication with said controller, the mobile computing device adapted to receive input from a user, the input selected from the group consisting of input setting the relative contribution of the electric motor and input setting the relative contribution of the combustion motor, the mobile computing device further adapted to wirelessly transmit input received from the user to the controller to set the relative contribution of the electric motor and the combustion motor.

17. The hybrid vehicle system according to claim 16 wherein the mobile computing device is a mobile phone having an application thereon programmed to receive input from the user and transmit input to the controller.

18. The hybrid vehicle system according to claim 16, wherein the relative contribution of the electric motor and the combustion motor is determined by the relative torque produced by the electric motor and the combustion motor.

* * * * *